(12) United States Patent
Kaku et al.

(10) Patent No.: US 9,108,548 B2
(45) Date of Patent: Aug. 18, 2015

(54) VEHICLE SEAT

(75) Inventors: Hiroyuki Kaku, Tochigi (JP); Jogen Yamaki, Saitama (JP); Hisato Oku, Saitama (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/809,087

(22) PCT Filed: Jul. 6, 2011

(86) PCT No.: PCT/JP2011/065443
§ 371 (c)(1),
(2), (4) Date: Jan. 8, 2013

(87) PCT Pub. No.: WO2012/005282
PCT Pub. Date: Jan. 12, 2012

(65) Prior Publication Data
US 2013/0113244 A1  May 9, 2013

(30) Foreign Application Priority Data

Jul. 9, 2010  (JP) .................................. 2010-157270

(51) Int. Cl.
*B60N 2/42* (2006.01)
*B60N 2/427* (2006.01)
*B60N 2/68* (2006.01)

(52) U.S. Cl.
CPC .......... *B60N 2/4235* (2013.01); *B60N 2/42709* (2013.01); *B60N 2/68* (2013.01); *B60N 2/42* (2013.01)

(58) Field of Classification Search
CPC ..... B60N 2/4235; B60N 2/42709; B60N 2/68
USPC .......................................... 297/216.1, 216.13
See application file for complete search history.

(56) References Cited

U.S. PATENT DOCUMENTS 6,299,239 B1 * 10/2001 Sagawa et al. ............ 296/187.12
7,448,674 B2 * 11/2008 Brunner et al. .......... 296/193.02

(Continued)

FOREIGN PATENT DOCUMENTS

| CN | 1133578 A | 10/1996 |
|---|---|---|
| EP | 1 857 320 | 11/2007 |
| JP | 9-169232 | 6/1997 |
| JP | 10-42995 | 2/1998 |
| JP | 11-222088 | 8/1999 |
| JP | 2000-103275 | 4/2000 |

(Continued)

OTHER PUBLICATIONS

Office Action issued in counterpart Chinese Patent Application No. 201180033842.1 (May 6, 2015) and corresponding English translation.

*Primary Examiner* — David R Dunn
*Assistant Examiner* — Jody Giacoman
(74) *Attorney, Agent, or Firm* — Hamre, Schumann, Mueller & Larson, P.C.

(57) ABSTRACT

A vehicle seat comprises: left and right base frames (side portions 52, 53 of pipe frame 5) which extend in an upward-and-downward direction and constitute left and right portions of a seat back frame (2); a pressure-receiving member (10) disposed between the left and right base frames, and configured to move rearward upon receipt of a rearward load of a predetermined magnitude or greater from an occupant; a force-receiving member (bracket 7) disposed adjacent to a left or right outer side of one base frame (side portion 53), and configured to receive a load from outside in a lateral direction; and a load transmission part (lower portion 51 of pipe frame 5) disposed under the pressure-receiving member (10), connected to a lower end of the one base frame, and configured to transmit the load from the force-receiving member to a side laterally opposite to that on which the force-receiving member is provided. The force-receiving member is provided such that the lower end of the one base frame (53) is located within a width in the upward-and-downward direction of the force-receiving member.

4 Claims, 5 Drawing Sheets

(56) References Cited

U.S. PATENT DOCUMENTS

| | | | |
|---|---|---|---|
| 7,631,926 B2* | 12/2009 | Fonseka et al. | 296/187.12 |
| 8,226,156 B2 | 7/2012 | Shiono et al. | |
| 8,292,353 B2* | 10/2012 | Ishimaru et al. | 296/193.06 |
| 2002/0024241 A1 | 2/2002 | Umezawa et al. | |
| 2009/0021061 A1 | 1/2009 | Yamaki et al. | |
| 2010/0244485 A1* | 9/2010 | Tanaka et al. | 296/187.08 |
| 2010/0270835 A1 | 10/2010 | Nitsuma | |
| 2012/0068506 A1* | 3/2012 | Yamaki et al. | 297/216.1 |
| 2013/0106153 A1 | 5/2013 | Kaku | |
| 2013/0113243 A1 | 5/2013 | Kaku et al. | |
| 2013/0113245 A1 | 5/2013 | Kaku et al. | |

FOREIGN PATENT DOCUMENTS

| | | | |
|---|---|---|---|
| JP | 2001-105947 | 4/2001 | |
| JP | 2007-253887 | 10/2007 | |
| JP | 2007-326441 | 12/2007 | |
| JP | 2009-46112 | 3/2009 | |
| JP | 2009-96216 | 5/2009 | |
| JP | WO2009/066730 A1 * | 5/2009 | B60R 21/055 |
| JP | 2009-126284 | 6/2009 | |
| JP | 2009-248818 | 10/2009 | |
| JP | 2011-25827 | 2/2011 | |
| WO | WO 95/11818 | 5/1995 | |
| WO | WO 2009/044729 | 4/2009 | |

\* cited by examiner

VEHICLE SEAT

TECHNICAL FIELD

The present invention relates to a vehicle seat in which a side collision load on a vehicle can be transmitted laterally from outside toward inside.

BACKGROUND ART

A vehicle seat comprising: a pair of side frames which constitute left and right portions of a seat back frame; a projecting portion (force-receiving member) provided on an upper portion of an outer surface of a laterally outside side frame; and a diagonal brace disposed to extend diagonally from an upper portion of an inner surface of the laterally outside side frame to a lower portion of the inner surface of an opposite side frame to join the side frames has hitherto been known in the art (see JP 2007-326441 A).

In the vehicle seat as mentioned above, a side collision load imposed to the projecting portion from outside in a lateral direction is transmitted to a side opposite to that on which the projecting portion is provided, through the laterally outside side frame, the diagonal brace and the laterally inside side frame.

However, with the conventional technique, the diagonal brace disposed to extend diagonally from an upper portion of an inner surface of one side frame to a lower portion of an inner surface of the other side frame, and joined to these side frames; therefore, disadvantageously, rearward movement of an occupant which would be caused upon receipt of a side collision load is restricted.

Against this backdrop, the inventors named in the present application have created the present invention in the process of research for providing a vehicle seat in which occupant's rearward movement upon receipt of a rear-end collision load is permitted while the transmission of the side collision load can be achieved satisfactorily.

SUMMARY OF INVENTION

A vehicle seat according to one aspect of the present invention comprises: left and right base frames which extend in an upward-and-downward direction and constitute at least left and right lower portions of a seat back frame; a pressure-receiving member disposed between the left and right base frames, and configured to move rearward upon receipt of a rearward load of a predetermined magnitude or greater from an occupant; a force-receiving member disposed adjacent to a left or right outer side of one of the base frames, and configured to receive a load from outside in a lateral direction; and a load transmission part disposed under the pressure-receiving member, connected to a lower end of the one of the base frames, and configured to transmit the load from the force-receiving member to a side laterally opposite to that on which the force-receiving member is provided. The force-receiving member is provided such that the lower end of the one of the base frames is located within a width in the upward-and-downward direction of the force-receiving member.

With this configuration, since the force-receiving member is provided such that the lower end of the one of the base frames to which the load transmission part is connected is located within the width of the force-receiving member in the upward-and-downward direction, a side collision load can be transmitted satisfactorily from the force-receiving member through the base frame to the load transmission part.

Moreover, since the side collision load from the force-receiving member is received by the lower end of the baser frame and the load transmission part is disposed under the pressure-receiving member, the route of transmission of the side collision load from the force-receiving member to a side laterally opposite to that on which the force-receiving member is provided can be set at a lower level. This makes it possible to ensure that a sufficient empty space remains available between the left and right base frames, so that an occupant can be allowed to move rearward upon receipt of a side collision load.

Additionally, the above-described configuration may further be configured such that a pair of side frames which are disposed adjacent to left and right outer sides of the respective base frames, and configured to constitute the left and right lower portions of the seat back frame are further provided; the base frame is shaped like a pipe; a side frame adjacent to the one of the base frames includes a contact portion configured to contact with the one of the base frames from front, rear and laterally outer sides; and the force-receiving member is disposed adjacent to a left or right outer side of the contact portion.

With this feature, the rigidity of the force-receiving member can be enhanced, and thus the force-receiving member can be prevented from deforming, so that a side collision load can be transmitted more effectively.

An additional configuration may be feasible in which the base frame is shaped like a pipe and a width in a front-rear direction of a lower end portion of the force-receiving member is greater than a width in the front-rear direction of an upper end portion thereof.

With this additional feature, the rigidity of the base frame can be enhanced, and thus the base frame can be prevented from deforming. In addition to this, a sufficient area for receiving a side collision load can be provided, so that the side collision load can be transmitted more effectively.

The force-receiving member may be configured to have a shape with a closed cross section, wherein a portion of at least one of a front wall and a rear wall thereof lower than the lower end of the one of the base frames provides an uneven shape.

With this configuration, the rigidity of the force-receiving member can be enhanced, and thus the force-receiving member can be prevented from deforming, and the side collision load can be transmitted more effectively.

MODE(S) FOR CARRYING OUT THE INVENTION

Hereafter, a description will be given of one embodiment of the present invention with reference to the drawings.

Figure 1:
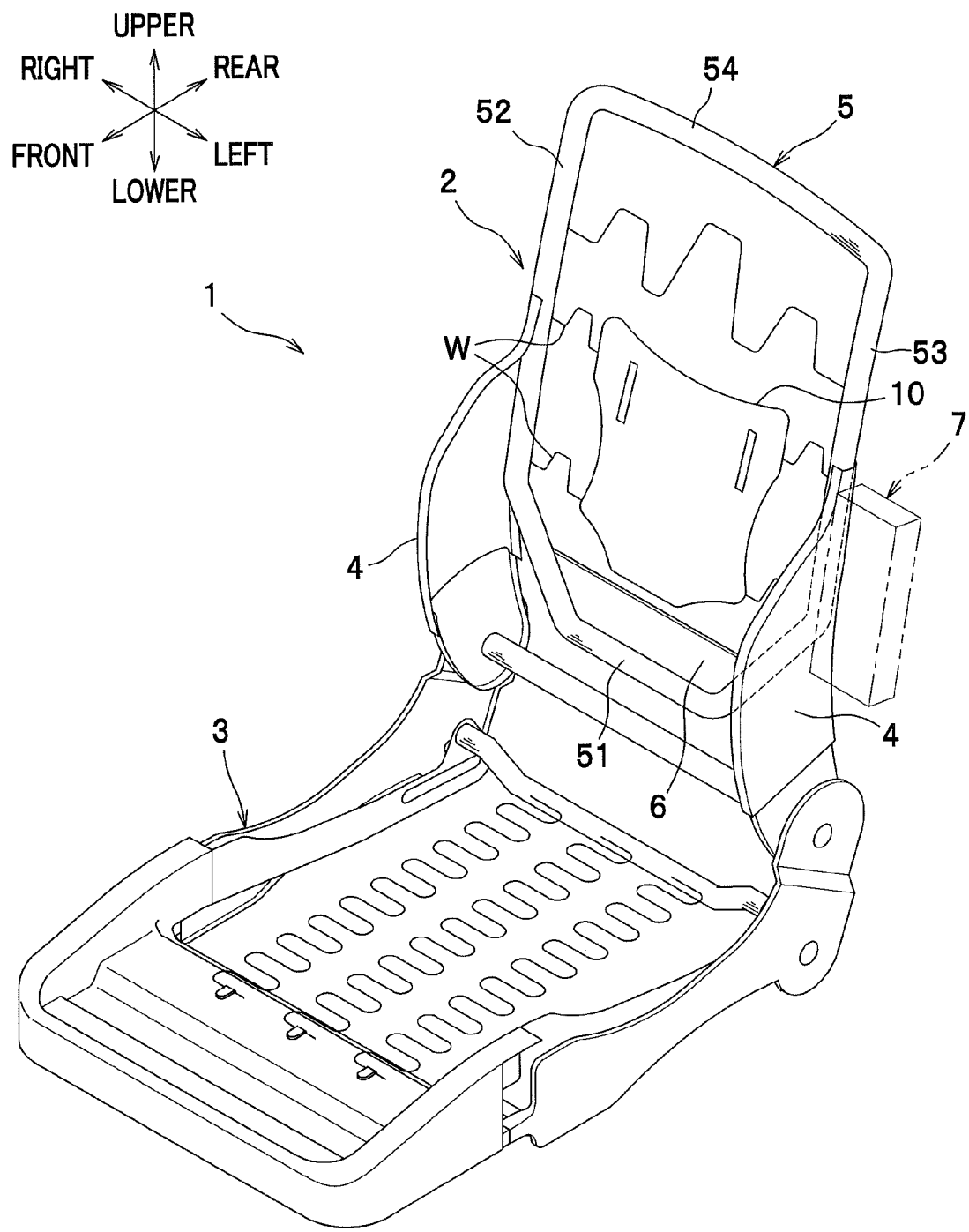
FIG. 1 is a perspective view of a vehicle seat according to one embodiment of the present invention.

A vehicle seat according to the present invention is made up of a seat frame 1 as shown in FIG. 1 the outside of which is covered with a seat cushion made of urethane foam or the like. The seat frame 1 includes a seat back frame 2 and a seat bottom frame 3. It is to be understood that in describing the present invention, the front/rear, left/right and upper/lower are defined as viewed from an occupant sitting on the seat.

The seat back frame 2 is configured to include a pair of side frames 4, a reinforcing frame for reinforcing the side frames 4, that is, a pipe frame 5, a lower frame 6, a bracket 7 as one example of a force-receiving member, and a pressure-receiving member 10.

The pipe frame 5 has a shape of a cylindrical pipe (with a closed section), and formed by bending in the shape of a substantially rectangular loop. This pipe frame 5 comprises side portions 52, 53 as one example of left and right base frames which extends in an upward-and-downward direction, a substantially U-shaped lower portion 51 which connects lower ends of the side portions 52, 53, and an upper portion 54 which connects upper ends of the side portions 52, 53.

The lower portion 51 of the pipe frame 5 has a laterally central portion disposed under the pressure-receiving member 10 and extending in the lateral direction, and left and right end portions bent obliquely upward and connected to the lower ends of the respective side portions 52, 53. This lower portion 51 is configured to serve, in combination with the lower frame 6, as a load transmission part, to transmit a load in the lateral direction.

The side frames 4 are plate-like members disposed adjacent, and joined, to laterally outer sides of lower portions of the pipe frame 5 (side portions 52, 53, respectively), and are configured to constitute, together with the side portions 52, 53, left and right lower portions of the seat back frame 2.

Figure 2:
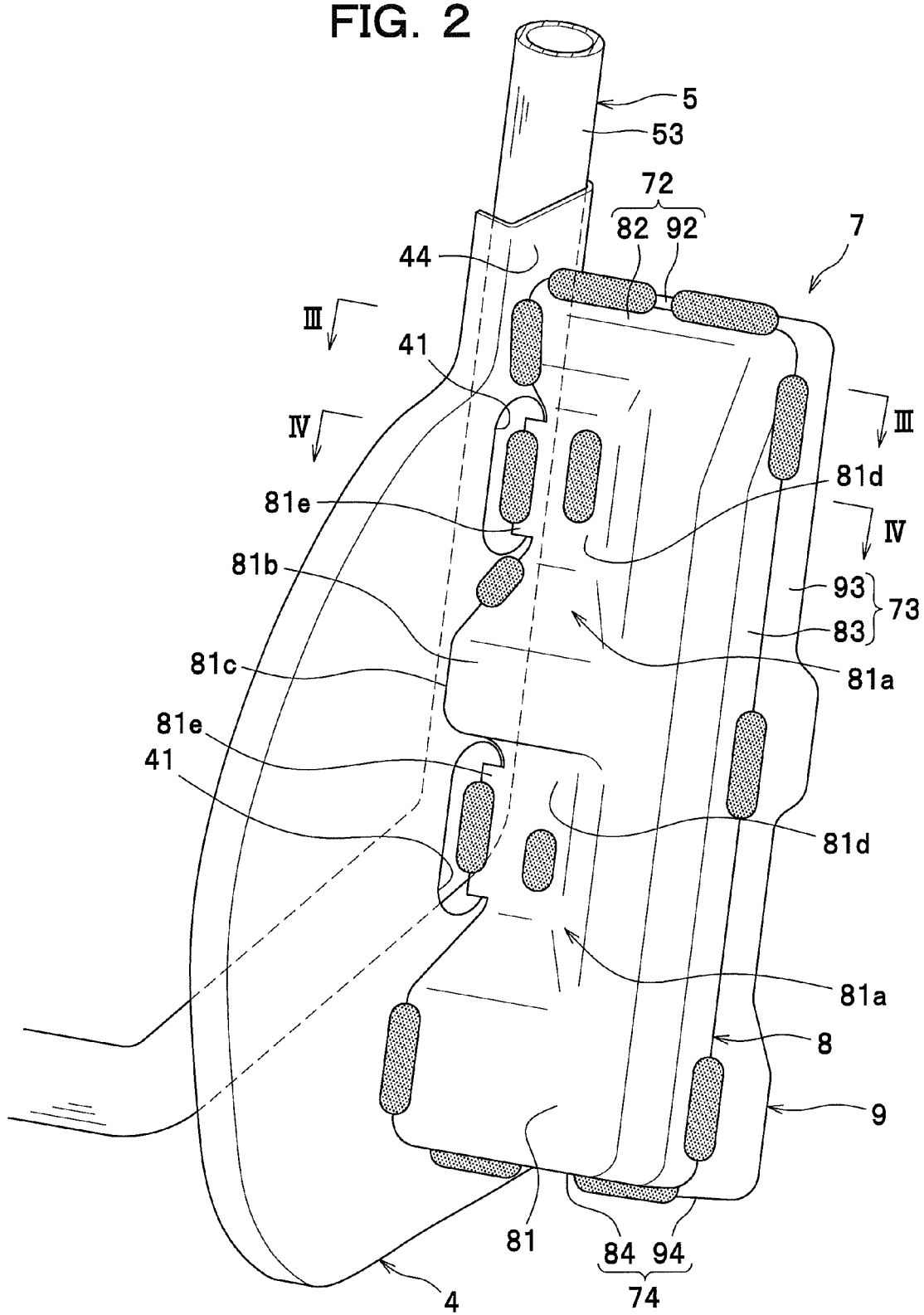
FIG. 2 is an enlarged perspective view of a bracket and its surrounding structure as viewed from the front.

As shown in FIG. 2, each side frame 4 has its upper portion configured to hold the pipe frame 5 (side portion 53) from the front and rear sides. With this configuration, the rigidity of the side portion 53 (a portion thereof being held) is enhanced. The side frame 4 is configured to protrude frontward beyond the pipe frame 5 to an extent gradually increasing toward downward. This configuration provides a frontwardly overhanging shape at each side of the seat back, and allows an air bag or other parts (not shown) to be fixed securely to the side frame 4 shaped like a plate extending in the front-rear direction.

Figure 3:
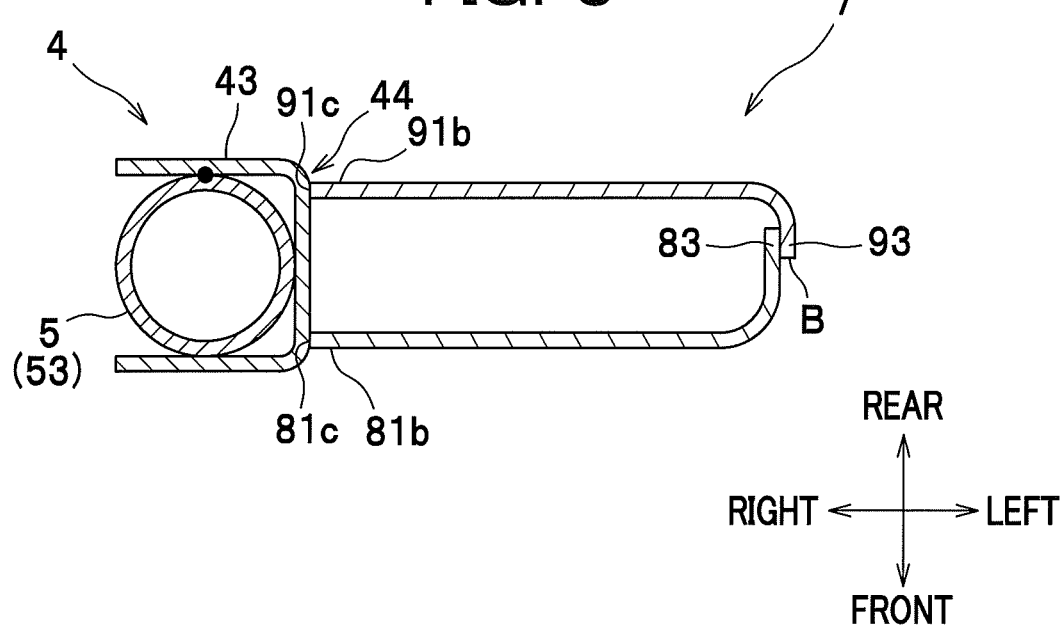
FIG. 3 shows section III-III of FIG. 2.

To be more specific, as shown in FIG. 3, the side frame 4 has an upper portion bent to have a U shape in cross section, and an inner surface thereof provides a contact portion 44 configured to contact with the side portion 53 (one of the base frames) of the pipe frame 5 from front, rear and left (laterally outer) sides. This configuration serves to increase the rigidity of the side portion 53 of the pipe frame 5.

Figure 4:
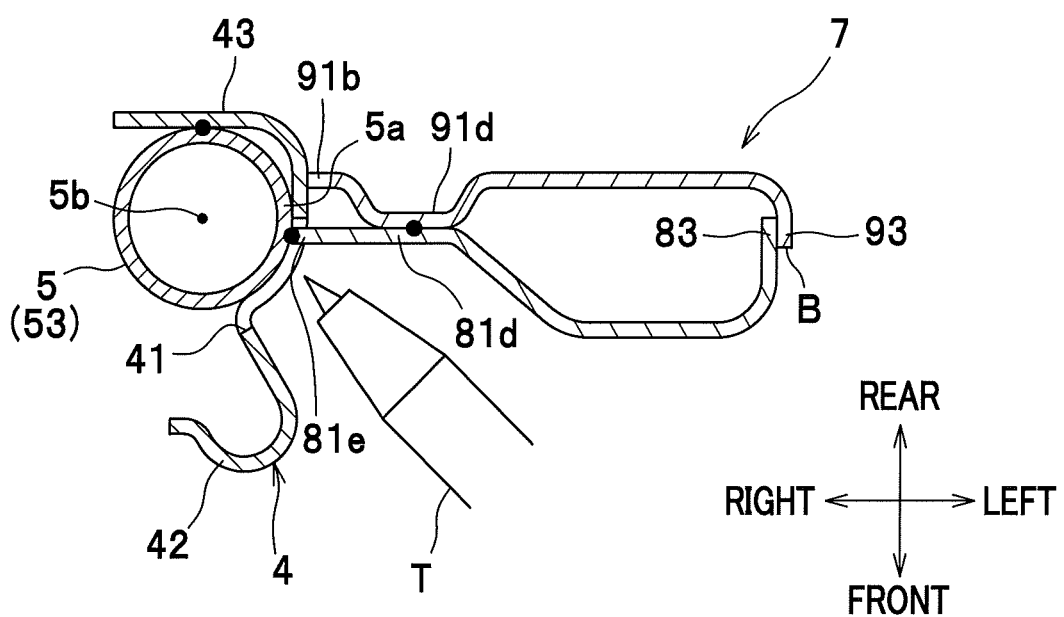
FIG. 4 shows section IV-IV of FIG. 2.

As shown in FIGS. 2, 4, each side frame 4 has a through hole 41 pierced through the left and right sides at an appropriate position thereof below the contact portion 44, and a front portion 42 thereof is bent inwardly to the left or to the right and further bent to the rear to form a U-shaped cross section. This configuration serves to improve the rigidity of the front portion 42 of the side frame 4.

A rear portion 43 of each side frame 4 is bent inwardly to the left or to the right to form an L-shaped cross section, and is joined to the pipe frame 5 by welding. In FIG. 4, welds or spots welded by a welding torch T are illustrated with exaggerated black dots.

Although not illustrated in the drawings, the right-side side frame 4 is also configured to be substantially similar to the left-side side frame 4 (side frame adjacent to the one of the base frames), wherein through holes 41 are not provided. It is also to be understood that although the side frame 4 in the present embodiment is configured to protrude frontward beyond the pipe frame 5 to an extent gradually increasing toward downward, the present invention is not limited to this configuration, and the side frame 4 may be configured to protrude rearward.

As shown in FIG. 1, the lower frame 6 is a plate-like member extending laterally, which is disposed below the pressure-receiving member 10 and joined to the lower portions of the side frames 4 and to the lower portion 51 of the pipe frame 5. With this configuration, a load imposed on the bracket 7 from outside in the left or right direction is transmitted through the lower frame 6 and the aforementioned lower portion 51 of the pipe frame 5 to the side laterally opposite to that on which the bracket 7 is provided.

The bracket 7 is a part provided discretely from the pipe frame 5 and the side frames 4, and disposed adjacent to the left side (laterally outer side) of the side portion 53 of the pipe frame 5 with the side frame 4 disposed therebetween. This bracket 7 is disposed near the side of a side panel such as a side pillar or a door of the vehicle when the vehicle seat is installed in the vehicle, so that a side collision load imposed on the vehicle is received thereby (the load is received from outside in the lateral direction).

Figure 5:
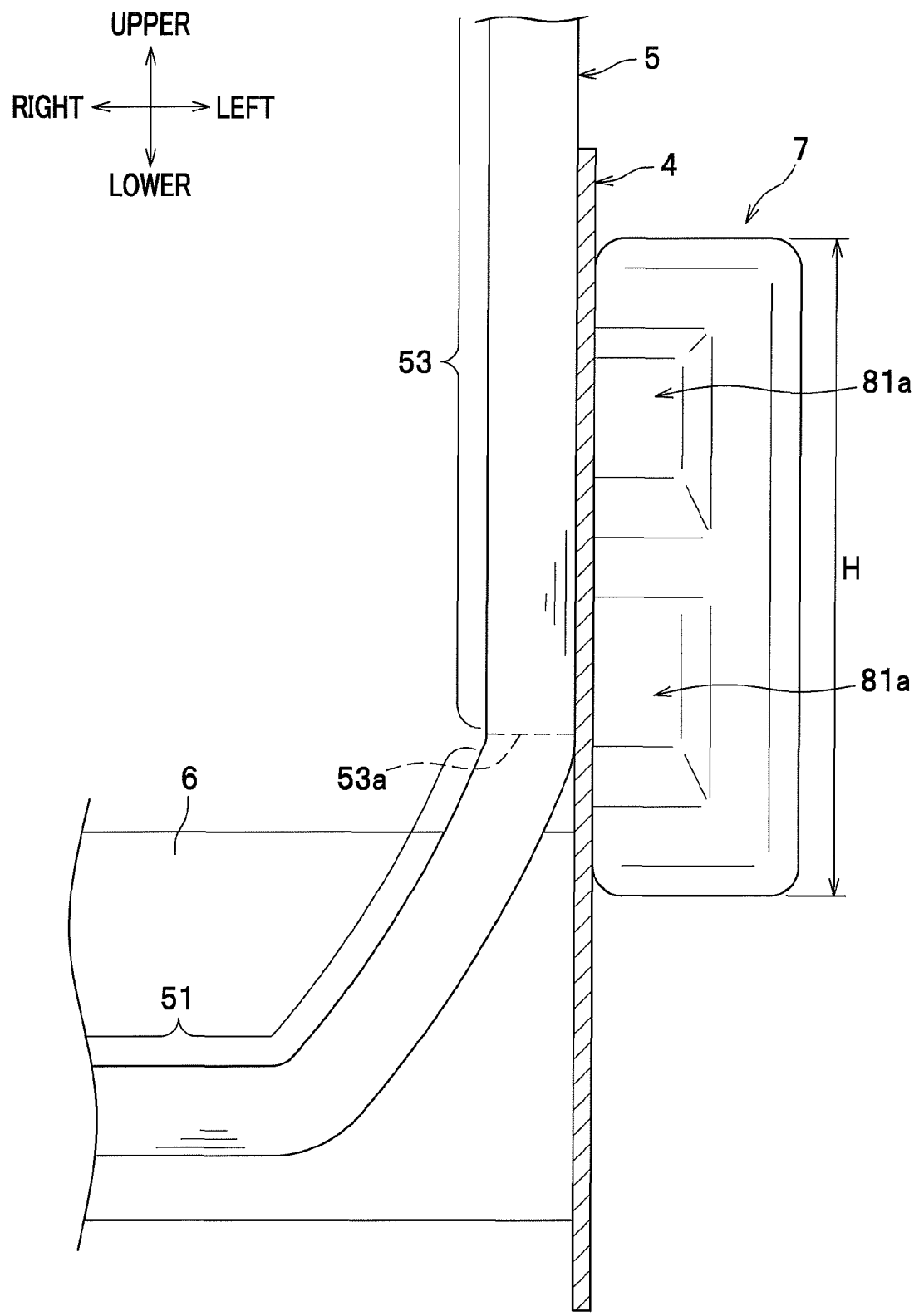
FIG. 5 is an enlarged view of the bracket and its surrounding structure as viewed from the front.

As shown in FIG. 5, the bracket 7 is provided (fixed) such that a lower end 53a (to which the lower portion 51 is connected) of the side portion 53 is located within a width H in the upward-and-downward direction of the bracket 7 itself. With this configuration, the side collision load can effectively be transmitted from the bracket 7 to the pipe frame 5 (load transmission part).

The bracket 7 is disposed to have the left-side side frame 4 held between the bracket 7 and the pipe frame 5, and provided adjacent to the left side of the left-side side frame 4. In particular, as shown in FIGS. 2, 3, edges 81c, 91c of laterally inner end portions 81b, 91b of an upper portion of the bracket 7 are disposed to contact with (adjacent to) the left side (a side) of the contact portion 44 of the side frame 4. With this configuration, a portion of the pipe frame 5 with increased rigidity and thus not easy to deform is used to receive a load from the bracket 7, and thus the load can be transmitted adequately.

Figure 6:
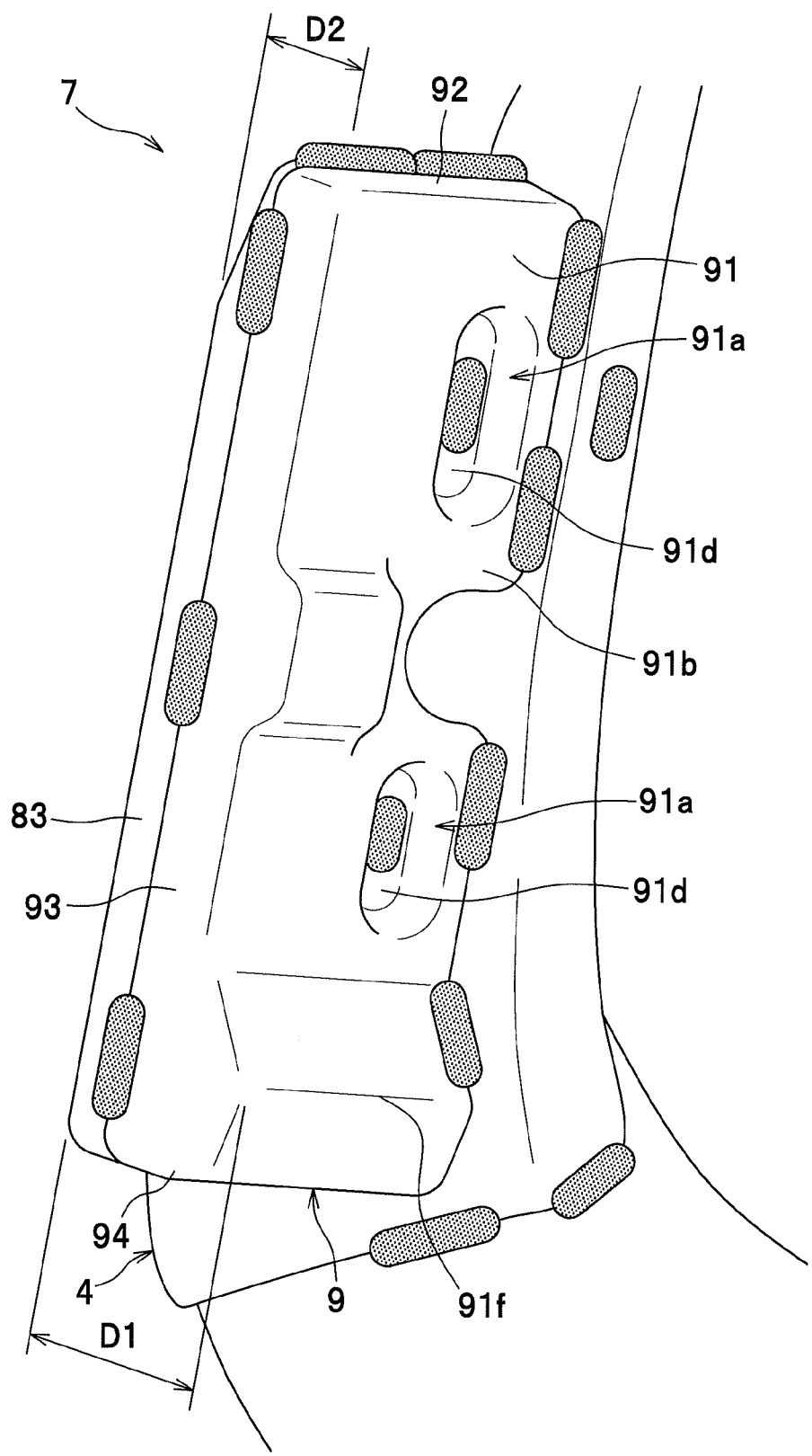
FIG. 6 is an enlarged perspective view of the bracket and its surrounding structure as viewed from the rear.

As shown in FIG. 2, the bracket 7 is directly fixed by welding to the pipe frame 5 through two through holes 41 (opening) formed in the side frame 4. With this configuration, irrespective of the angle and magnitude of the side collision load received, the load can be transmitted properly from the bracket 7 to the pipe frame 5 without getting affected by deformation of the side frame 4. In FIG. 2 and FIG. 6, the welded spots are illustrated with shades of dots.

To be more specific, the bracket 7 is segmented in front and rear halves of a front-side box-like member 8 and a rear-side box-like member 9 which are fitted together, and configured such that the box-like members 8, 9, once combined together, form a closed section as taken along a plane perpendicular to the lateral direction.

The front-side box-like member 8 includes a plate-like front wall 81 elongated in the upward-and-downward direction longer than extending in the lateral direction, an upper wall 82 extending from an upper end of the front wall 81 rearward, an outer wall 83 extending from a laterally outer end of the front wall 81 rearward, and a lower wall 84 extending from a lower end of the front wall 81 rearward, all of which are provided integrally. In other words, the front-side box-like member 8 is configured to have a shape of a box which opens to the rear and to a laterally inner side.

In the front wall 81, two recessed portions 81a (providing an uneven shape) disposed in a portion separate from upper and lower ends of the front wall 81 and configured to be recessed inwardly in the front-rear direction are arranged in positions spaced out vertically at a predetermined distance. With this configuration, the rigidity of the front wall 81 is enhanced, and thus a side collision load can be transmitted effectively to the pipe frame 5 by the high-rigidity front wall 81.

Each recessed portion 81*a* is formed at a laterally inner end portion 81*b* of the front wall 81, and thus opens to the front and to the laterally inner side. With this configuration, an edge 81*c* of the end portion 81*b* is bent to the front and to the rear, and thus the rigidity of the edge 81*c* located at an output side of the side collision load can be increased, so that the side collision load can effectively be transmitted to the pipe frame 5 or the like.

The lower recessed portion 81*a* is formed to extend downward beyond a lower end 53*a* of the side portion 53 of the pipe frame 5. In other words, the front wall 81 has a portion (lower than the lower end 53*a* of the side portion 53) having an uneven shape. With this configuration, since the lower portion of the front wall 81, laterally opposite to the lower portion 51 of the pipe frame 5, is provided with increased rigidity, deformation of the bracket (especially of its lower portion) which would be caused upon receipt of a load and tend to narrow the gap between the lower portion 51 and the side frame 4 can be restricted. As a result, the load can be transmitted adequately to the pipe frame 5 (side portion 53).

Each recessed portion 81*a* has a bottom wall 81*d*, at which an extension portion 81*e* (part of the force-receiving member provided at a laterally inner side thereof) extending laterally inward beyond the edge 81*c* of the front wall 81 is formed. This extension portion 81*e* is disposed inside the through hole 41 of the side frame 4 described above, and extends to the pipe frame 5, so that the extension portion 81*e* abutting on the pipe frame 5 is welded to the pipe frame 5.

Since only the extension portion 81*e* is passed through the through hole 41, the through hole 41 may be sized to conform to the extension portion 81*e*, and thus the through hole 41 may be made smaller so that the rigidity of the side frame 4 can be enhanced. To be more specific, in the present embodiment, the through hole 41 is shaped like an elongate hole having dimensions smaller than the width of the pipe frame 5 in a front-rear direction, and smaller than the whole length of the edge 81*c* of the front wall 81 and greater than the extension portion 81*e* in a vertical direction.

The size of the through hole 41 may be designed to have, at the largest, an area comparable or smaller than a cross-sectional area of a laterally inner end portion (adjacent an end located at a side from which the side collision load is outputted) of the bracket 7. The through hole 41 formed to have a size described above makes it possible to impart a higher rigidity of the side frame 4, for example, in comparison with a through hole formed in the side frame to have such a size as to allow the laterally inner end portion of the bracket 7 to be passed through in its entirety.

Although the extension portion 81*e* is provided in the present embodiment, the present invention is not limited to this configuration; i.e., a configuration without the extension portion 81*e* may also be possible. In this configuration, some gap may be left between the pipe frame 5 and the edge 81*c* of the front wall 81, but this gap still permits welding by which the pipe frame 5 and the bracket can be joined directly.

The extension portion 81*e* is, as shown in FIG. 4, fixed to a central portion 5*a* located at a center in the front-rear direction of the pipe frame 5. With this configuration, the load from the bracket 7 is transmitted intensively to the central portion 5*a* of the pipe frame 5, and thus the load can be transmitted more effectively.

A center 5*b* in the front-rear direction of the pipe frame 5 is located within a width in the front-rear direction of the bracket 7. With this configuration, upon side collision, the load can be transmitted more effectively because the bracket 7 can be prevented from slipping out to the front or to the rear on a cylindrical outer surface of the pipe frame 5.

As shown in FIG. 2, an upper portion and a lower portion of the edge 81*c* of the front wall 81 are fixed to the side frame 4 by welding. In other words, the front wall 81 is fixed directly to both of the side frame 4 and the pipe frame 5. With this configuration, the load received by the bracket 7 is transmitted not only through the pipe frame 5 but also through the side frame 4 to the load transmission part (the lower frame 6 and the lower portion 51 of the pipe frame 5), and thus more effective transmission of the load can be ensured. It is appreciated that the load transmitted to the load transmission part can be transmitted to the vehicle body side through a console box or the like provided at a side opposite to that on which the bracket 7 is provided.

As shown in FIG. 6, the rear-side box-like member 9 includes a plate-like rear wall 91 elongated in the upward-and-downward direction longer than extending in the lateral direction, an upper wall 92 extending from an upper end of the rear wall 91 frontward, an outer wall 93 extending from a laterally outer end of the rear wall 91 frontward, and a lower wall 94 extending from a lower end of the rear wall 91 frontward, all of which are provided integrally. In short, the rear-side box-like member 9 is configured to have a shape of a box which opens to the front and to the laterally inner side.

In the rear wall 91, two recessed portions 91*a* (providing an uneven shape) disposed in a portion separate from upper and lower ends of the rear wall 91 and configured to be recessed inwardly in the front-rear direction are arranged in positions spaced out vertically at a predetermined distance. With this configuration, the rigidity of the rear wall 91 is enhanced, and thus a side collision load can be transmitted effectively to the laterally inner side by the high-rigidity rear wall 91.

Each recessed portion 91*a* is disposed opposite to a corresponding recessed portion 81*a* of the front-side box-like member 8 in the front-rear direction, whereas each bottom wall to 91*d* and a bottom wall 81*d* of a corresponding recessed portion 81*a* are disposed to adjoin to each other, as shown in FIG. 4. With this configuration, the two bottom walls 81*d*, 91*d* adjoining to each other constitute a thick portion located substantially at the center in the front-rear direction of the bracket 7, and thus effective transmission of the side collision load can be achieved.

The two bottom walls 81*d*, 91*d* adjoining to each other are joined together by welding. With this configuration, the rigidity of the bracket 7 can be enhanced, and thus effective transmission of the side collision load can be achieved.

The two bottom walls 81*d*, 91*d* adjoining to each other are located within a width in the front-rear direction of the pipe frame 5. With this feature, the side collision load can be effectively transmitted to the pipe frame 5 through the thick portion made up of the joined bottom walls 81*d*, 91*d*.

Furthermore, the center 5*b* in the front-rear direction of the pipe frame 5 is located within a width in the front-rear direction of the thick portion made up of the joined bottom walls 81*d*, 91*d*. With this configuration, the load can be transmitted intensively to the center 5*b* or therearound of the pipe frame 5 through the thick portion made up of the joined bottom walls 81*d*, 91*d*.

As shown in FIG. 6, the lower recessed portion 91*a* is, like that of the front wall 81, formed to extend downward beyond a lower end 53*a* (not illustrated in FIG. 6) of the side portion 53 of the pipe frame 5. In other words, the rear wall 91, as well, has a portion (lower than the lower end 53a of the side portion 53) having an uneven shape. With this configuration, since the lower portion of the rear wall 91, laterally opposite to the lower portion 51 of the pipe frame 5, is provided with increased rigidity, deformation of the bracket (especially of its lower portion) which would be caused upon receipt of a load and tend to narrow the gap between the lower portion 51 and the side frame 4 can be restricted. As a result, the load can be transmitted adequately to the pipe frame 5 (side portion 53).

A laterally inner end 91b of the rear wall 91 is fixed to the side frame 4 by welding. To be more specific, as shown in FIG. 4, the laterally inner end 91b of the rear wall 91 is joined to a closed-section-shaped portion made up of a rear portion 43, bent into an L-shape, of the side frame 4 and a left-side rear portion of the pipe frame 5. With this configuration, the side collision load transmitted from the rear wall 91 to a laterally inner side is received properly by the closed-section-shaped portion, and thus can be transmitted effectively to the pipe frame 5.

Furthermore, as shown in FIGS. 2, 6, the upper wall 92, outer wall 93 and lower wall 94 of the rear-side box-like member 9 are disposed over the upper wall 82, outer wall 83 and lower wall 84 of the front-side box-like member 8, and fixed to the walls 82-84, respectively by welding.

With this configuration, as shown in FIG. 3, 4, the outer wall 73 of the bracket 7 has a stepped profile B (providing an uneven shape) formed, at a position separate from the front and rear ends thereof, by overlapping the outer walls 83, 93 (two plate-like portions) of the respective box-like members 8, 9. With this configuration, a portion of the outer wall 73 substantially at the center thereof in the front-rear direction is formed as a thick portion by overlapping the outer walls 83, 93, and thus the rigidity of the outer wall 73 is enhanced, so that a side collision load can be transmitted effectively.

Similarly, the upper wall 72 and lower wall 74 of the bracket 7 also have stepped profiles B (not shown) formed by overlapping the upper walls 82, 92 and the lower walls 84, 94, respectively, of the box-like members 8, 9. That is, on the upper wall 72, outer wall 73 and lower wall 74 of the bracket 7, the stepped profile B is formed continuously across the walls 72-74 as a result of fitting of the rear-side box-like member 9 on the front-side box-like member 8.

With this configuration, the thick portion of the outer wall 73 is formed continuously to the thick portions of the upper wall 72 and the lower wall 74, and thus a side collision load received by the thick portion of the outer wall 73 can be transmitted effectively to the laterally inner side through the upper and lower continuous thick portions.

As shown in FIG. 6, the rear wall 91 has a lower end portion 91f formed to bulge rearward in a substantially ridge-like shape. With this configuration, the bracket 7 is made to have a width D1 in a front-rear direction of its lower end portion greater than a width D2 in the front-rear direction of its upper end portion. As a result, the rigidity of the lower end portion (portion opposite to the lower portion 51) of the bracket 7 is increased, and thus deformation of the lower portion of the bracket 7 can be suppressed, so that a load can be transmitted effectively to the pipe frame 5 (side portion 53).

As shown in FIG. 1, the pressure-receiving member 10 is a substantially rectangular plate-like member made of plastic, and is disposed between the side portions 52, 53 (left and right base frames) of the pipe frame 5. This pressure-receiving member 10 is fastened, in a rearwardly movable manner, to the side portions 52, 53 of the pipe frame 5 by four wires W.

The pressure-receiving member 10 is configured to move rearward when the vehicle is rear-ended, collides against something while being reversed, or otherwise receives a rear-end collision load which imposes a rearward load greater than a predetermined level on the occupant. Accordingly, the occupant's upper body subsides rearward, so that the impact of the rear-end collision load against the occupant can be softened. As the pressure-receiving member 10 like this, a prevailing structure can be adopted, and thus a detailed explanation is omitted herein.

Advantageous effects of the vehicle seat according to the present embodiment as described above are summarized hereinafter.

Since the bracket 7 is provided such that the lower end 53a of the side portion 53 of the pipe frame 5 is located within the width H of the bracket 7 in the upward-and-downward direction, a side collision load can be transmitted satisfactorily from the bracket 7 to the pipe frame 5.

Moreover, since it is configured that the side collision load from the bracket 7 is received by the lower end of the side portion 53 and that the lower frame 6 and the lower portion 51 of the pipe frame 5 are disposed under the pressure-receiving member 10, the route of lateral transmission of the side collision load can be set at a lower level. This makes it possible to ensure that a sufficient empty space remains available between the side portions 52, 53, so that an occupant can be allowed to move rearward upon receipt of a rear-end collision load.

Since the bracket 7 is disposed adjacent to the left side of the contact portion 44 of the side frame 4 which contacts with the side portion 53 of the pipe frame 5 from front, rear and left sides, the rigidity of the pipe frame 5 can be increased. Accordingly, the pipe frame 5 can be prevented from deforming, so that a side collision load can be transmitted more effectively.

Since the width D1 in the front-rear direction of the lower end portion of the bracket 7 is greater than the width D2 in the front-rear direction of the upper end portion of the bracket 7, the rigidity of the lower portion of the bracket 7 can be increased, and thus the bracket 7 can be prevented from deforming. Furthermore, a sufficient area for receiving a side collision load can be provided, so that the side collision load can be transmitted more effectively.

Since the bracket 7 is configured to have a shape with a closed cross section and lower portions of the front wall 81 and the rear wall 91 are formed with uneven shapes, the rigidity of the bracket 7 can be increased, and the bracket 7 can be prevented from deforming, so that the side collision load can be transmitted more effectively.

Since the bracket 7 is not fixed through the side frame 4 but fixed directly to the pipe frame 5, the side collision load received, irrespective of its angle and magnitude, can be transmitted properly from the bracket 7 to the pipe frame 5 without getting affected by deformation of the side frame 4.

Since the bracket 7 is provided discretely from the pipe frame 5, each member can be formed into any shape freely, and can be made easy to assemble.

Since the bracket 7 and the pipe frame 5 are fixed together through an opening (through hole 41) formed in the side frame 4, the need, for example, to divide the side frame 4 into front and rear parts or upper and lower parts so as to detour around a position in which the bracket and the pipe frame are fixed together can be obviated, and thus the rigidity of the side frame 4 can be enhanced.

Since the opening formed in the side frame 4 is configured as a through hole 41, the rigidity of the side frame 4 can be further enhanced, in comparison with a configuration in which the opening is shaped as a groove (or a hollow) that opens to the front or to the rear, because an upper portion and a lower portion of the side frame 4 above and below the position in which the bracket 7 and the pipe frame 5 are fixed together can be connected at the front and rear sides of that position.

Since the bracket 7 is fixed to a portion of the pipe frame 5 having a shape with a closed section, the load received by the bracket 7 can be transmitted properly to the load transmission part (the lower frame 6 and the lower portion 51 of the pipe frame 5) through the pipe frame 5 which can be resistant to deformation.

Since the bracket 7 is fixed directly to the both of the side frame 4 and the pipe frame 5, the load received by the bracket 7 is transmitted not only through the pipe frame 5 but also through the side frame 4 to the load transmission part, so that the load can be transmitted more effectively.

Since the center 5b of the pipe frame 5 is located within the width in the front-rear direction of the bracket 7, the bracket 7 upon receipt of side collision load can be prevented from slipping out to the front or to the rear on a cylindrical outer surface of the pipe frame 5, so that the load can be transmitted more effectively.

Since the bracket 7 is fixed to the portion 5a located at a center in the front-rear direction of the pipe frame 5, the load from the bracket 7 can be transmitted intensively to the central portion 5a at the center in the front-rear direction of the pipe frame 5, so that the load can be transmitted more effectively.

Although the embodiment of the present invention has been described above, the present invention may be carried out into practice in appropriately modified configurations, as in the other embodiments described below.

In the above-described embodiment, the base frame (side portions 52, 53 of the pipe frame 5) is designed to have a shape of a cylindrical pipe, but the present invention is not limited to this configuration; for example, a base frame having a polygonal cross section, a solid cylindrical member, or a solid prismatic member may be usable.

In the above-described embodiment, the force-receiving member is embodied in the bracket 7 composed of two box-like members 8, 9, but the present invention is not limited to this configuration; for example, a bracket composed of a single box-like member, or a bulky plate-like member may be usable.

In the above-described embodiment, the base frame (side portion 53) and the load transmission part (lower portion 51) are formed integrally, but the present invention is not limited to this configuration. For example, an alternative configuration may be such that a load transmission part formed as a separate frame is connected to a lower end portion of a base frame shaped like a pipe extending in upward-and-downward direction.

In the above-described embodiment, the lower frame 6 and the lower portion 51 of the loop-shaped pipe frame 5 are joined together to form a load transmission part, but the present invention is not limited to this configuration. For example, in a case that the lower portion 51 of the pipe frame 5 in the above-described embodiment is separated in the midsection and joined to the lower frame 6, the lower portions 51 extending halfway and the lower frame 6 may be configured to serve as a load transmission part.

In the above-described embodiment, the bracket 7 and the pipe frame 5 are fixed together by welding, but the present invention is not limited to this configuration; for example, a bolt may be applied for fixing these members together.

In the above-described embodiment, the through hole 41 is configured to serve as an opening, but the present invention is not limited to this configuration; for example, the opening may be a hollow which opens to the front or to the rear.

In the above-described embodiment, part of the bracket 7 (i.e., extension portions 81e) is passed through the opening (through holes 41), but the present invention is not limited to this configuration; part of the base frame may be passed through the opening and fixed directly to the bracket.

In the above-described embodiment, the bracket 7 is directly fixed to the pipe frame 5, but the present invention is not limited to this configuration; for example, it may be fixed only to the side frame in the above-described embodiment.

In the above-described embodiment, the seat back frame 2 includes the side frames 4, but the present invention is not limited to this configuration; for example, an alternative configuration in which no side frame is provided may be feasible.

In the above-described embodiment, the base frame (pipe frame 5) is configured to have a shape with a closed section in its entirety, but the present invention is not limited to this configuration; it may be advantageous only if at least a portion of the base frame to which the force-receiving member is fixed has a shape with a closed section.

In the above-described embodiment, the bracket 7 is configured such that the width D1 in the front-rear direction of the lower end portion thereof is greater than the width D2 in the front-rear direction of the upper end portion thereof, but the present invention is not limited to this configuration; for example, the width of the lower end portion may be equal to the width of the upper end portion.

In the above-described embodiment, the lower portions of the both of the front wall 81 and the rear wall 91 of the bracket 7 have recessed portions 81a, 91a (uneven shape), but the present invention is not limited to this configuration; for example, an alternative configuration in which any one of the front wall and the rear wall has an uneven shape may be feasible. Alternatively, a configuration in which neither of the front wall nor the rear wall has an uneven shape may also be feasible. It is to be understood that the uneven shape is not limited to such recessed portions but a stepped profile or the like may be provided, instead.

The invention claimed is:

1. A vehicle seat, comprising:
   a seat back frame including:
      a continuous pipe frame having:
         a first side portion that extends along an upward-and-downward direction,
         a second side portion that extends along the upward-and-downward direction,
         an oblique portion connected to the second side portion at a first bent portion, wherein the oblique portion extends along an obliquely downward direction, and
         a lateral portion connected to the oblique portion at a second bent portion, the second bent portion being below the first bent portion,
         wherein the lateral portion extends along a lateral direction from the second bent portion to form a lower portion of the seat back frame, and the lower portion is connected to the first side portion;
   a force-receiving member disposed at an outer side of the second side portion and fixed directly to the first bent portion so that the first bent portion is located within a width along the upward-and-downward direction of the force-receiving member, and the force-receiving member is configured for receiving a load from the outer side along the lateral direction and transmitting the load received by the force-receiving member to the oblique portion via the first bent portion; and
   a pressure-receiving member disposed above the lower portion and between the first side portion and the second side portion, the pressure-receiving member being configured for moving rearward upon receipt of a rearward load of a predetermined magnitude or greater from an occupant.

2. The vehicle seat according to claim 1, wherein the seat back frame further comprises a first side frame and a second side frame, the first side frame being disposed adjacent to the outer sides of the first side portion, and the second side frame being disposed adjacent to the outer side of the second side portion, wherein the second side portion is shaped like a pipe;

the second side frame includes a contact portion configured to contact with the second side portion from front, rear and laterally outer side; and the force-receiving member is disposed adjacent to the outer side of the contact portion.

3. The vehicle seat according to claim 1, wherein the second side portion is shaped like a pipe; and the force-receiving member includes as lower end portion and an upper end portion wherein a width in a front-rear direction of the lower end portion is greater than a width in the front-rear direction of the upper end portion.

4. The vehicle seat according to claim 1, wherein the force-receiving member has a shape with a closed cross section, and a portion of at least one of a front wall and a rear wall thereof is lower than the lower end of the second side portion, which provides an uneven shape.

* * * * *